(12) United States Patent
Liu et al.

(10) Patent No.: US 9,176,213 B2
(45) Date of Patent: Nov. 3, 2015

(54) ADAPTIVE CODED MODULATION IN LOW EARTH ORBIT SATELLITE COMMUNICATION SYSTEM

(71) Applicant: Northrop Grumman Systems Corporation, Falls Church, VA (US)

(72) Inventors: Daniel N. Liu, Torrance, CA (US); Michael P. Fitz, Los Angeles, CA (US); Xiaofen Chen, Palos Verdes, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 624 days.

(21) Appl. No.: 13/800,127

(22) Filed: Mar. 13, 2013

(65) Prior Publication Data

US 2014/0266867 A1    Sep. 18, 2014

(51) Int. Cl.
*G01S 1/04* (2006.01)
*H04B 7/185* (2006.01)
*H04L 1/00* (2006.01)

(52) U.S. Cl.
CPC ............. *G01S 1/042* (2013.01); *H04B 7/18513* (2013.01); *H04B 7/18515* (2013.01); *H04B 7/18543* (2013.01); *H04L 1/0002* (2013.01); *H04L 1/0003* (2013.01); *H04L 1/0006* (2013.01); *H04L 1/0009* (2013.01)

(58) Field of Classification Search
CPC ... H04L 1/0009; H04L 1/0003; H04L 1/0026; H04L 5/006; H04L 1/0025; H04L 1/0002; H04L 1/0006; H04W 72/0453; H04W 24/08; H04W 72/085; H04W 72/0406; H04W 24/02; H04W 24/00; H04B 7/18513

USPC .......... 342/200; 370/252, 314, 316, 317, 318; 455/3.02, 7, 42, 68, 69, 126

See application file for complete search history.

(56) References Cited

U.S. PATENT DOCUMENTS

| | | | | |
|---|---|---|---|---|
| 6,091,716 | A | * | 7/2000 | Gorday et al. ................. 370/314 |
| 6,147,981 | A | * | 11/2000 | Prescott ........................ 370/318 |
| 6,188,678 | B1 | * | 2/2001 | Prescott ........................ 370/318 |
| 6,925,113 | B2 | * | 8/2005 | Kim et al. ...................... 375/227 |

(Continued)

FOREIGN PATENT DOCUMENTS

| | | |
|---|---|---|
| WO | 2009021238 | 2/2009 |
| WO | 2011066515 | 6/2011 |

OTHER PUBLICATIONS

Moad, D. et al; Predictive channel estimation for optimized resources allocation in DVB-S2 networks; Personal, Indoor and Mobile Radio Communications, 2009 IEEE 20th International Symposium on; pp. 2608-2612, Sep. 13-16, 2009.

(Continued)

*Primary Examiner* — Peter Bythrow
(74) *Attorney, Agent, or Firm* — Patti & Malvone Law Group, LLC (57) ABSTRACT

A method and system for providing adaptive coded modulation in LEO satellite communication system is provided. The received power signal at the receiver is predicted by the LEO satellite transmitter without using channel feedback from the receiver. The receiver rapidly detects changes in transmission rate and changes its demodulation rate in tandem with the LEO satellite. Certain conditions that vary slowly, such as local weather and ground moisture level, are provided to the transmitter from the receiver at a much slower rate than that used in normal data communications.

20 Claims, 9 Drawing Sheets

(56) References Cited

U.S. PATENT DOCUMENTS

| | | | |
|---|---|---|---|
| 7,469,124 B1* | 12/2008 | Chethik | 455/3.02 |
| 7,486,634 B2* | 2/2009 | Itoh | 370/318 |
| 7,961,665 B2* | 6/2011 | Kimmich et al. | 370/316 |
| 8,270,291 B2* | 9/2012 | Mizrahi et al. | 370/218 |
| 8,488,664 B2* | 7/2013 | Yokomakura et al. | 375/232 |
| 8,654,815 B1* | 2/2014 | Forenza et al. | 375/141 |
| 8,862,076 B2* | 10/2014 | Whinnett | 455/115.1 |
| 2002/0191703 A1* | 12/2002 | Ling et al. | 375/267 |
| 2008/0165840 A1* | 7/2008 | Morris et al. | 375/227 |
| 2008/0165875 A1* | 7/2008 | Mundarath et al. | 375/262 |
| 2008/0254749 A1* | 10/2008 | Ashkenazi et al. | 455/69 |
| 2009/0023384 A1* | 1/2009 | Miller | 455/12.1 |
| 2009/0041100 A1* | 2/2009 | Kimmich et al. | 375/220 |
| 2009/0190491 A1* | 7/2009 | Miller | 370/252 |
| 2010/0150054 A1* | 6/2010 | Becker et al. | 370/316 |
| 2010/0309793 A1* | 12/2010 | Choi et al. | 370/252 |
| 2011/0128867 A1* | 6/2011 | Tian et al. | 370/252 |
| 2011/0188561 A1* | 8/2011 | Mizrahi et al. | 375/227 |
| 2012/0076032 A1* | 3/2012 | Mundarath et al. | 370/252 |
| 2012/0076228 A1* | 3/2012 | Wu et al. | 375/267 |
| 2012/0164940 A1* | 6/2012 | Manea et al. | 455/7 |
| 2013/0114442 A1* | 5/2013 | Park et al. | 370/252 |
| 2014/0064118 A1* | 3/2014 | Hong et al. | 370/252 |

OTHER PUBLICATIONS

Jiang, M. et al; Link adaptation in LTE-A uplink with Turbo SIC receivers and imperfect channel estimation; Information Sciences and Systems (CISS), 2011 45th Annual Conference on; pp. 1-6; Mar. 23-25, 2011.

Falahati, S. et al; Adaptive modulation systems for predicted wireless channels; Global Telecommunications Conference, 2003. GLOBECOM '03. IEEE, vol. 1; pp. 357-361; Dec. 1-5, 2003.

Luglio, M.; Fade prediction and control systems; Signals, Systems, and Electronics, 1995. ISSSE '95, Proceedings., 1995 URSI International Symposium on, pp. 71-75, Oct. 25-27, 1995.

Jiang, W. et al; Prediction and Compensation of Sun Transit in LEO Satellite Systems; CMC '10 Proceedings of the 2010 International Conference on Communications and Mobile Computing—vol. 02; pp. 495-499.

* cited by examiner

PRIOR ART

ADAPTIVE CODED MODULATION IN LOW EARTH ORBIT SATELLITE COMMUNICATION SYSTEM

FIELD OF THE INVENTION

This invention relates to using adaptive coded modulation without real-time feedback of SNR in a LEO satellite communication system.

BACKGROUND

Satellite systems are used for many reasons, including observation, communication, navigation, weather monitoring and research. Satellites and their orbits can vary widely, depending on their function. One common classification system for satellites is based on their orbit, for example, low earth orbit (LEO), polar orbit or geostationary orbit.

A LEO satellite system is commonly defined as having an orbit between 160 kilometers and 2000 kilometers above the Earth's surface. It has many purposes, particularly for communication systems, since a less powerful amplifier is required for transmission than for satellites with higher orbits. LEO satellites travel at a high velocity in order to maintain their orbit, and typically make one complete revolution around the Earth in about 90 minutes. Since they are not geostationary, LEO satellites are used in a network, or constellation, of several linked satellites to provide continuous transmission coverage. Receivers are positioned at various places around the Earth and communicate with any given LEO satellite only when it is within range. By the same token, the satellite communicates with any given receiver for only a portion of its orbit.

Satellite systems are costly, operate in widely varying link conditions, and generally have long transmission delays. Transmissions between satellites and ground-based receivers can also be heavily impacted by the background noise. These transmissions are characterized by a signal-to-noise ratio (SNR) which is the ratio of the signal power to the noise power. The channel capacity of a LEO satellite communication, $C_{LEO}$, is typically given by $$C_{LEO} = BW \times \log_2(1+SNR)$$

where BW denotes available bandwidth for communication and SNR denotes Signal-to-Noise ratio. This formula is known as the Shannon limit or Shannon capacity and is the theoretical maximum information transfer rate of the channel, for a particular noise level.

Initially, prior art satellite communication systems used a fixed rate transmission. This required no feedback but was highly sub-optimal when used in a system with widely varying received SNR. An improvement on fixed transmission is adaptive coded modulation (ACM) that measures SNR in real-time and provides feedback to govern the ACM transmission rate.

Figure 1:
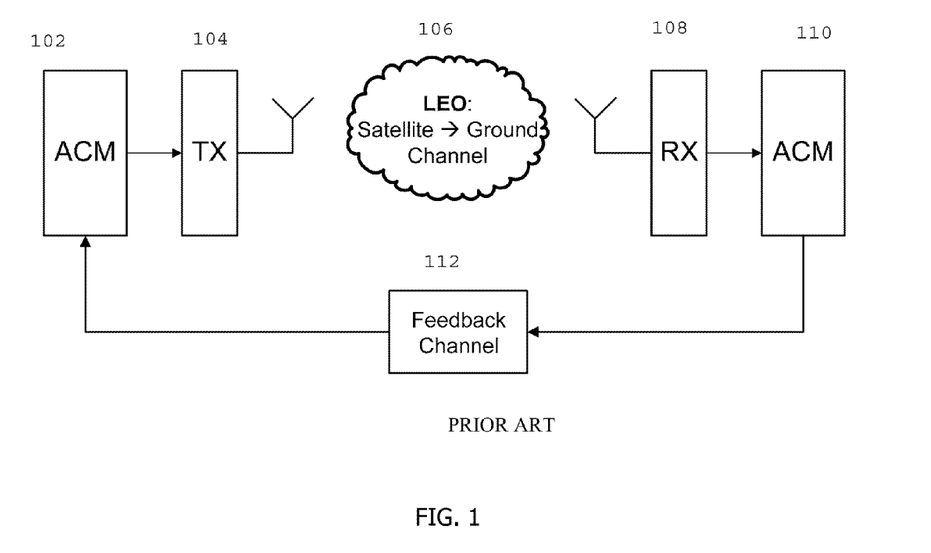
FIG. 1 illustrates prior art ACM in LEO/GEO Satellite Communication System.

It is well-known that adaptive coded modulation (ACM) will maximize the throughput of a channel based on the current channel conditions. Traditional satellite communication systems (i.e. either LEO or GEO) require a feedback channel (i.e. from the ground receiver (Rx) to satellite transmitter (Tx)) so they can adaptively change coding rate and modulation format at the transmitter in response to conditions at the receiver. A conventional ACM method relies on obtaining current channel state information (CSI) from the feedback channel. Thus, it is essentially a "closed-loop" communication system as depicted in FIG. 1. As shown in FIG. 1, an ACM module 102 in a LEO satellite provides ACM data to transmitter 104 which is sent over a communication channel 106 to receiver 108. Receiver 108 provides the received data to ACM module 110 which demodulates the data and provides feedback to ACM module 102 about received SNR using feedback channel 112. However, long transmission delays in a satellite system can make near real-time feedback difficult to accomplish.

Thus, a need exists to provide ACM in a LEO satellite system without requiring real-time feedback of received SNR.

SUMMARY

Adaptive Coded Modulation in LEO satellite communication system is accomplished by predicting the received power signal at the receiver without using channel feedback.

In a first embodiment, the invention is a method for transmitting data to a receiver by a LEO satellite including the steps of predicting a received signal-to-noise-ratio (SNR) and adapting the coding rate and modulation format of the transmitter to the predicted SNR without real-time feedback about the received SNR from the receiver.

In a second embodiment, the invention is a LEO satellite for transmitting data to a receiver having one or more processors for predicting a received signal-to-noise-ratio (SNR) and a transmitter adapting the coding rate and modulation format of the transmitter to the predicted SNR without real-time feedback about the received SNR from the receiver.

In a third embodiment, the invention is a LEO satellite system for providing adaptive coded modulation (ACM) during LEO satellite communications having a transmitter in the LEO satellite for performing ACM in conjunction with predicted received SNR without real-time feedback and a ground-based receiver for rapidly detecting changes in transmission rate and changing its demodulation rate in tandem with the transmitter.

In any of the above embodiments, the invention further includes wherein the receiver rapidly detects changes in transmission rate and changes its demodulation rate in tandem with the LEO satellite.

In any of the above embodiments, the invention further includes wherein the predicted SNR is based on location factors including at least one of range, elevation and trajectory.

In any of the above embodiments, the invention further includes wherein the predicted SNR is based on propagation loss factors including at least one of free space path loss, atmospheric/weather attenuation, receiver terminal G/T, transmitter terminal Equivalent isotropically radiated power (EIRP), predicted moisture level, predicted ground weather, pointing loss of a transmitter array, high power amplifier output backoff (HPA OBO) and predicted regulatory flux density limit.

In any of the above embodiments, the invention further includes wherein the predicted SNG is based on electronic performance factors, including at least one of gain or antenna scanning.

In any of the above embodiments, the invention further includes wherein data is transmitted by the transmitter at a variable rate in the range of Gigabytes per second (Gb/s), and feedback about variable conditions at the receiver is provided to the LEO satellite at a non-time critical period of at least once per hour.

In any of the above embodiments, the invention further includes wherein the variable conditions at the receiver include at least one of local weather and ground moisture level.

DESCRIPTION OF THE DRAWINGS

Features of example implementations of the invention will become apparent from the description, the claims, and the accompanying drawings in which:

DETAILED DESCRIPTION

LEO satellite systems operate in widely varying link conditions and generally have long transmission delays between transmitters and receivers. Due to the varying link conditions, Adaptive Coded Modulation (ACM) is very useful for providing throughput that is near the best achievable based on the Shannon capacity as shown by $$C_{LEO} = BW \times \log_2(1 + SNR) \quad (1)$$

where BW denotes available bandwidth for communication and SNR denotes Signal-to-Noise ratio.

However, in order to adapt to the current channel condition, the transmitter must know the channel a priori before any transmission can take place, particularly the received signal-to-noise ratio (SNR), characterized by the equation:

$$SNR = P_s/N \quad (2)$$

where Ps denotes the received signal power and N denotes the received noise power.

Closely examining the Shannon capacity formula reveals the fact that the LEO satellite channel capacity, $C_{LEO}$, is solely a deterministic function of the received SNR. With the received noise power usually fixed at some constant (for example, receiver RF front-end thermal condition), the received SNR can be completely determined from the received signal power $P_s$.

The received power $P_s$ from a LEO satellite transmitter (and hence the SNR) at the ground receiver is largely predictable: While it is varying over time (i.e. over each LEO pass), it varies in a deterministic fashion. Thus, in one embodiment, the invention selects a coding rate and modulation format at the transmitter in an open loop fashion as depicted in FIG. 2.

Figure 2:
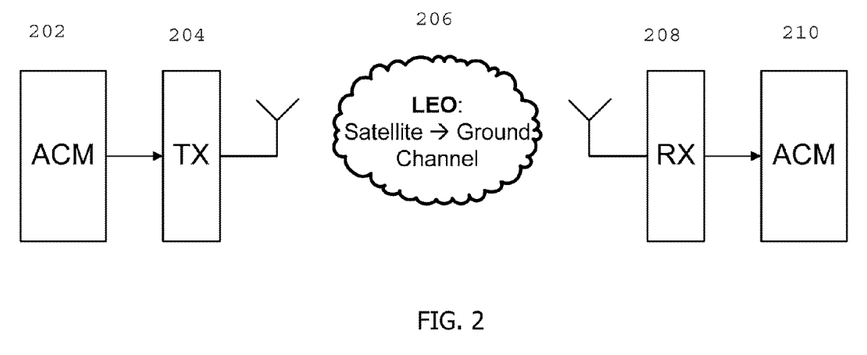
FIG. 2 illustrates a LEO Satellite Communication System using ACM in one embodiment of the invention.

As shown in FIG. 2, an ACM module 202 in a LEO satellite provides ACM data to transmitter 204 which is sent over a communication channel 206 to receiver 208. Receiver 208 provides the received data to ACM module 210 which demodulates the data. Unlike the system of FIG. 1, however, ACM module 202 operates largely independently of ACM module 210 and does not require a feedback channel in real time.

Examples of predictable components of SNR include free space path loss, receiver terminal G/T (gain-to-noise-temperature), transmitter terminal equivalent isotropically radiated power (EIRP), pointing loss of a transmitter array, high power amplifier output backoff (HPA OBO), predicted regulatory flux density limit, predicted moisture level and predicted ground weather. Predictable SNR can vary rapidly (e.g., free space path loss and pointing loss in an array during a LEO orbit) or slowly (e.g., gain change of an amplifier over life). This predictability allows non-time critical feedback of link characteristics so that the transmitter can accurately know statistics describing the received SNR before a transmission occurs. This accurate characterization allows the selection of a coding and modulation that will maximize the transmission rate while ensuring a desired link availability. More precisely, in a LEO satellite communication system, the received signal power $P_s$ is a predictable and deterministic function of:

$$P_s\left(\text{Free space path loss}, Rx\frac{G}{T}, EIRP, Tx \text{ Point Loss}, HPA\ OBO\right) \equiv \quad (3)$$
$$f\left(\text{Free space path loss}, Rx\frac{G}{T}, EIRP, Tx \text{ Point Loss}, HPA\ OBO\right).$$

It is important to realize the above function is deterministic and predictable for every pass of the LEO satellite. For example, arguments such as Tx Point Loss and HPA OBO are parameters which can be measured during the factory calibration process even before the launch of the satellite. The received power can be characterized by the range, R, between the LEO satellite (Tx) and the ground terminal (Rx) as:

$$P_s(R) = \quad (4)$$
$$10\log_{10}(P_t) + 20\log_{10}\left(\frac{\sqrt{G}\lambda}{4\pi R}\right) - L(Tx \text{ Point Loss}, HPA\ OBO),$$

where $P_t$ is the transmitted power, G is the antenna gain and L(.) denotes the loss function due to transmitter pointing loss and HPA back-off. As shown by the above equation, during each LEO pass, R is the only parameter that varies over time (i.e. depending on the actual geometric position of the satellite relative to the ground terminal). Also, it is also important to realize that the geometric position of the LEO satellite is completely deterministic and predictable due to LEO orbital mechanics. Therefore, the received power $P_s$ is indeed predictable based on the relative position of LEO satellite (i.e. can be expressed in terms of elevation angle) and thus, so is SNR.

Figure 3:
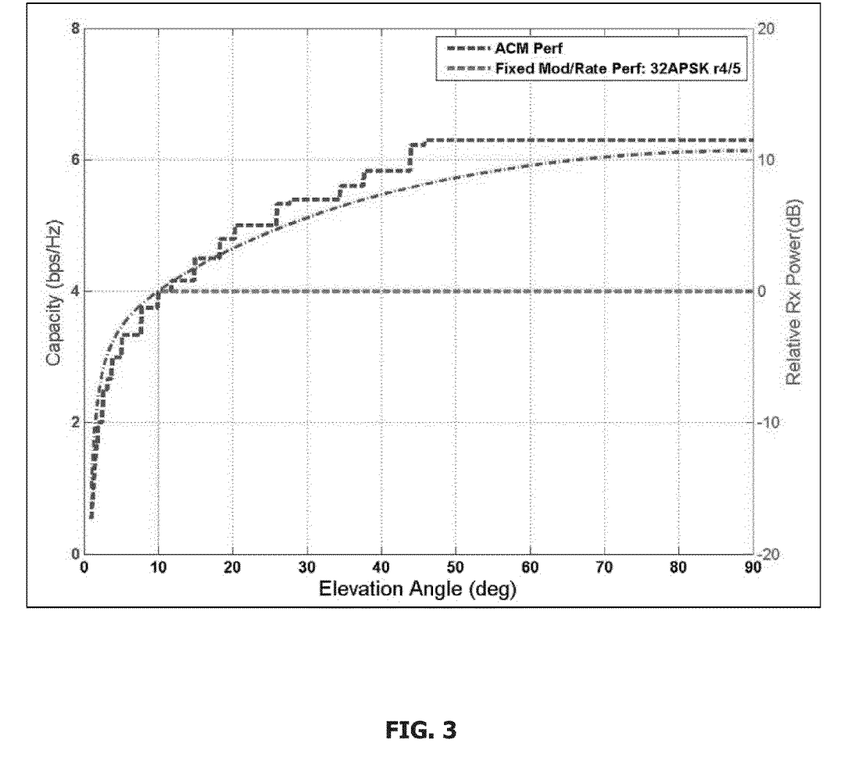
FIG. 3 is a graph depicting received power and achievable throughput as a function of elevation angle of a LEO satellite during each pass.

FIG. 3 is a graph depicting the received power and achievable throughput on the Y axis as a function of elevation angle of a LEO satellite on each pass on the X axis. Line 310 represents the relative received power at the ground station as a function of elevation angle according to equation (3) above. Line 320 represents the achievable rate using a fixed coding and modulation scheme. The intersection of lines 310 and 320 shows that fixed coding and modulation is optimal at only a single elevation angle, approximately 10 degrees in this example. Line 330 depicts the achievable rate using adaptive coding modulation according to an embodiment of the invention. The use of ACM allows more communication time by providing transmissions during elevation angles smaller than 10 degrees. It also increases the spectral efficiency at higher elevation angles.

As clearly demonstrated in FIG. 3, the received power can be characterized as a function of elevation angle and becomes deterministic during each LEO pass. Therefore, the LEO satellite (Tx) can "pre-program" its transmission mode depending on its relative geometric location without the need of a feedback channel.

There is significant throughput benefit in having the ability to support a wide range of data rates so that full exploitation of this accurate SNR characterization is only achieved with a finely quantized modulation and coding scheme. In addition, a desirable characteristic in minimizing the frequency of the link condition feedback is the ability of the receiver to accurately detect a rate change and seamlessly change demodulation to accommodate the new rate. This seamless receiver operation enables the transmitter and receiver to remain only loosely coupled.

Figure 4A:
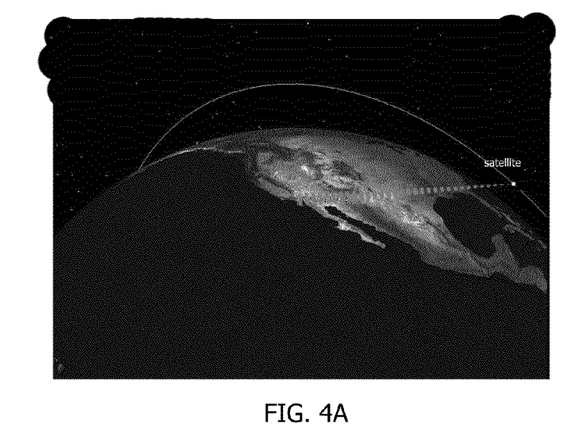
FIGS. 4A, 4B and 4C illustrate the operation of an embodiment of the invention.
Figure 4B:
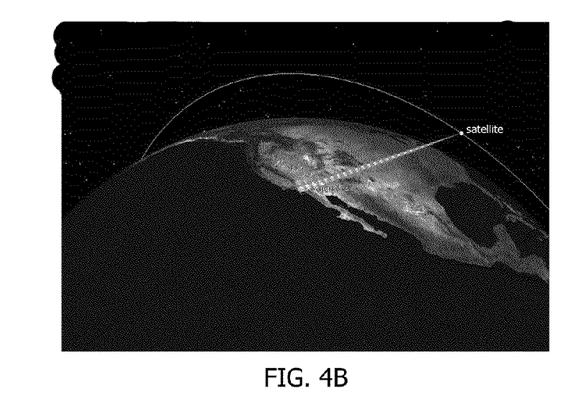
Figure 4C:
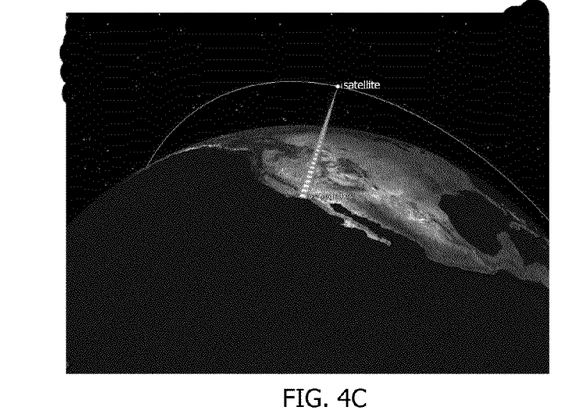

The operation of the inventive LEO satellite transmitter is shown in FIGS. 4A-4C, which show predictive adaptive coded modulation for a single pass of a satellite transmitter over a receiver. In FIG. 4A, a LEO satellite approaches a ground station in Los Angeles, Calif., at a range of 3220 km, an elevation of 1.6° and an azimuth of 104.2°. The predicted SNR is 3.5 dB resulting in a ACM Data Rate of 1.7 Gbps. In FIG. 4B, the satellite has moved further along its orbit, having a range of 2724 km relative to the base station, an elevation of 6.8° and an azimuth of 87.9°. This results in a SNR of 11.3 dB and an ideal ACM data rate of 4.2 Gbps. For this particular orbit and base station, an ACM data rate of 4.2 Gbps appears to be a maximum, as shown in FIG. 4C.

Figure 5A:
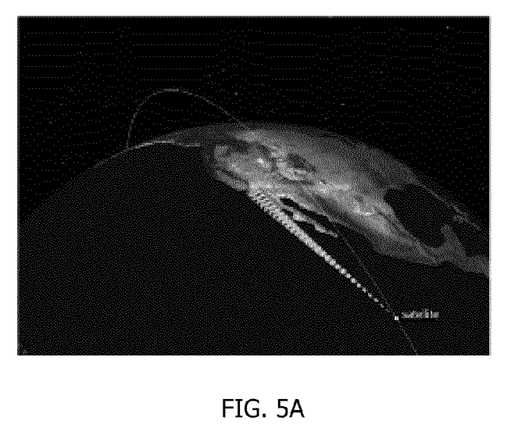
FIGS. 5A, 5B and 5C further illustrate the operation of an embodiment of the invention.
Figure 5B:
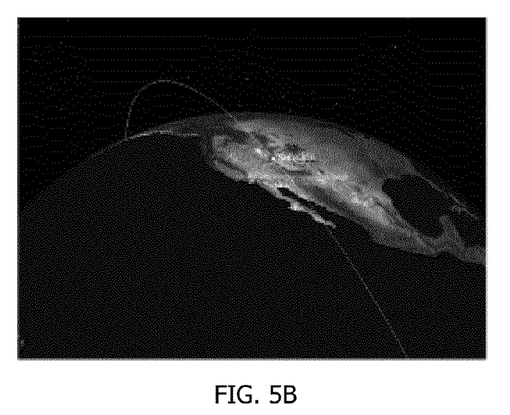
Figure 5C:
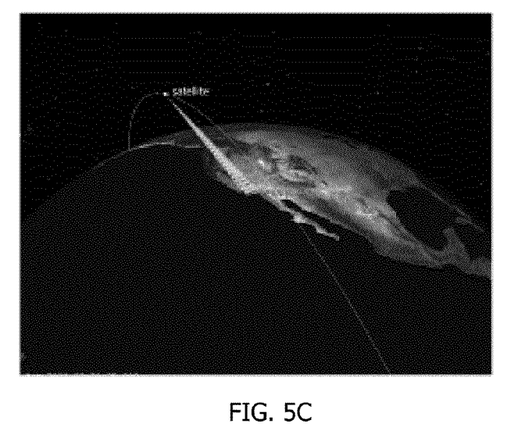

FIGS. 5A-5C depict the operation of another orbit of a LEO satellite where the satellite passes more directly over the base station in Los Angeles, Calif. In FIG. 5A, at a range of 2999 km, elevation of 3.7° and an azimuth of 165.4°, an ACM data rate of 3.3 Gbps is possible. Then, in FIG. 5B, the satellite has a range of 1003 km, an elevation of 55.4° and an azimuth of 166.2°, resulting in a SNR of 21.4 dB and an ACM data rate of 7.3 Gbps. Finally, in FIG. 5C, as the LEO satellite continues to move away from the base station, its range is 3002 km, its elevation is 3.9° and azimuth is 347.2°, resulting in a SNR of 9.1 and a reduced ACM data rate of 3.3 Gbps.

Figure 6A:
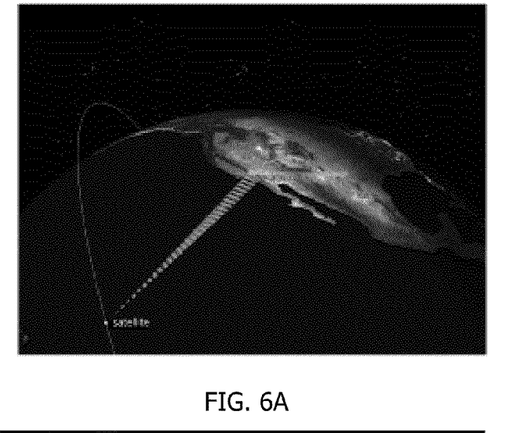
FIGS. 6A, 6B and 6C further illustrate the operation of an embodiment of the invention.
Figure 6B:
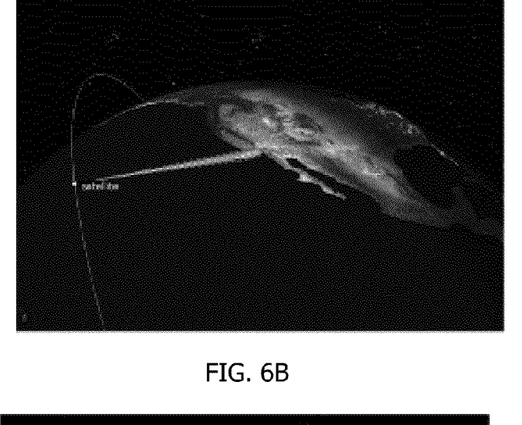
Figure 6C:
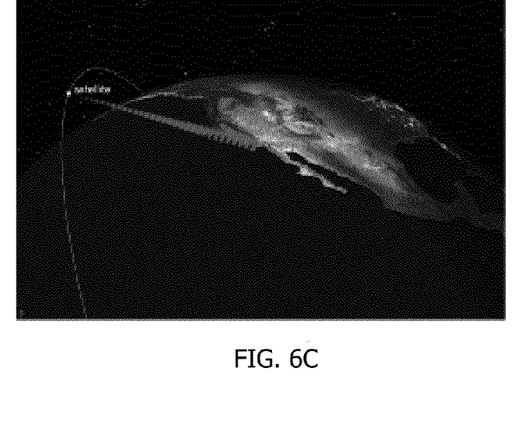

A third orbit of a LEO satellite relative to a base station at Los Angeles is shown in FIGS. 6A-6C. In FIG. 6A, the satellite begins to transmit to the base station at a range of 3271 km, an elevation of 1.1° and an azimuth of 228.5°, using an ACM data rate of 0.8 Gbps. At a maximum for this orbit as shown in FIG. 6B, the satellite has a range of 2622, an elevation of 8.0° and an azimuth of 270.1°, resulting in an ACM data rate of 4.2 Gbps. Finally, the satellite stops transmitting when it reaches a range of 3285 km, an elevation of 1.1°, an azimuth of 311.5° and an ACM data rate of 0.8 Gbps as shown in FIG. 6C.

It is understood that there are less-predictable elements that can impact the received SNR, such as: weather attenuation, ground moisture level and local weather. First, it is envisioned that any deployable modern LEO satellite communication systems are capable of delivering date rates at Gb/s, which inherently has a symbol rate easily at Gsymbol/sec. The time scale of the communication is happening at nanoseconds (i.e. $10^{-9}$ sec). On the other hand, local weather events around the ground terminal are happening on the time scale of hours. That is, a weather forecast of local rain, storm or snow information can be made available on the order of hours. Thus, special instructions can certainly be fed back to the LEO satellite transmitter to better coordinate with local weather situation. But, such feedback channel is only needed for special weather condition and is not required for usual operation and the feedback may only need to be provided, for example, once an hour or once a day.

Figure 7:
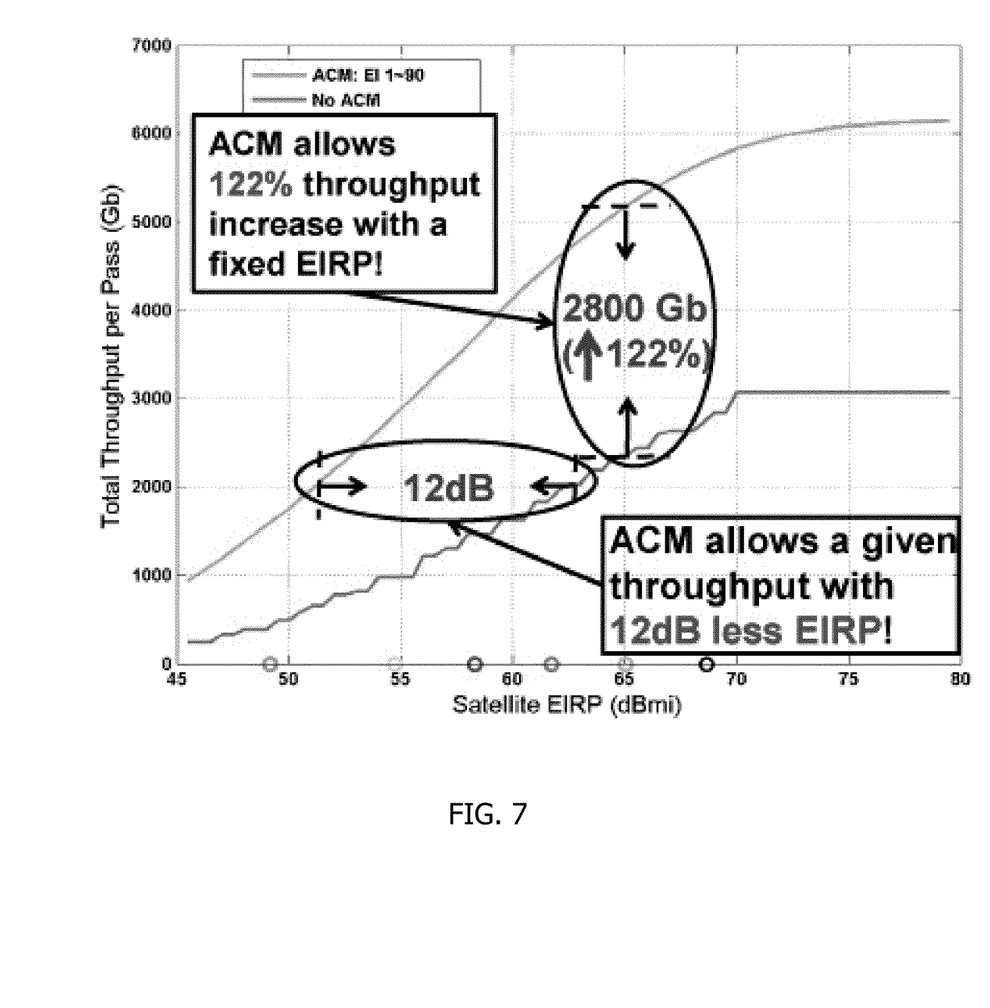
FIG. 7 is a graph depicting total throughput per pass against satellite EIRP.

FIG. 7 demonstrates the throughput and power benefits of ACM compared to conventional fixed coding and modulation. For example, at the same Rx EIRP of 65 dBmi, ACM provides 2800 Gb more total throughput per LEO pass, or equivalently a 122% increased, compared to fixed coding and modulation scheme. On the other hand, at the same total throughput of 2000 Gb per LEO pass, ACM achieves a power saving of 12 dBmi compared to fixed coding and modulation scheme.

Figure 8:
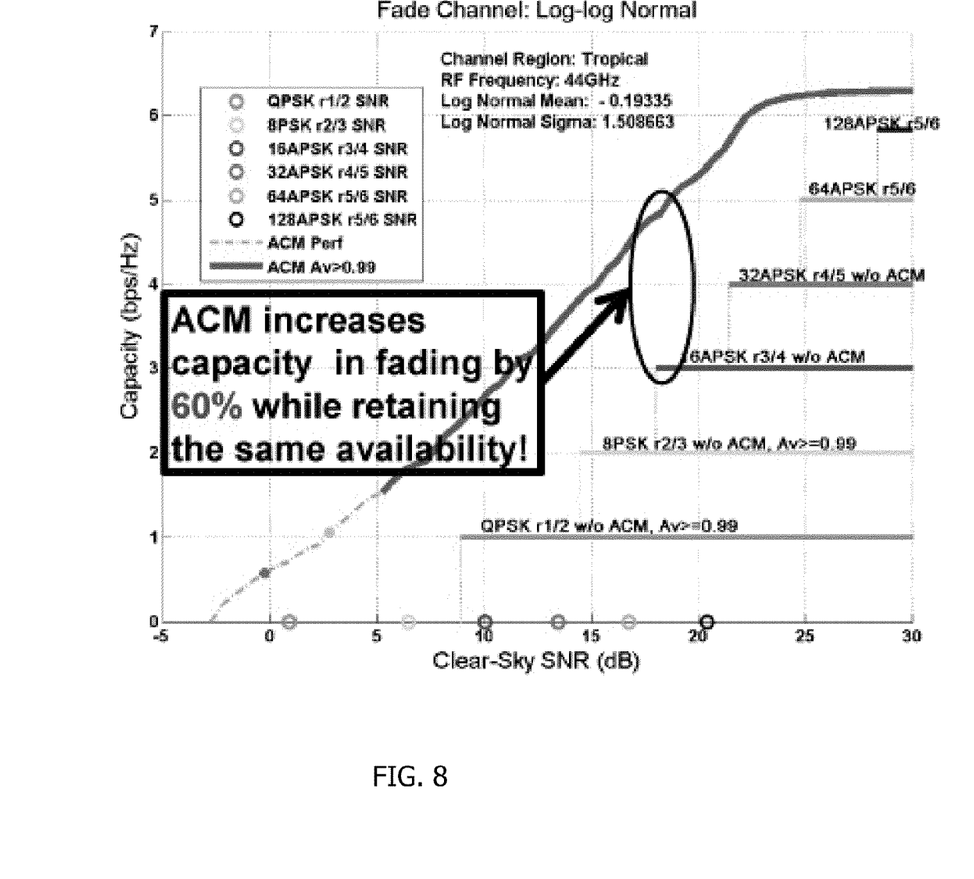
FIG. 8 is a graph depicting channel capacity against clear-sky SNR.

FIG. 8 shows the throughput benefits of ACM compared to fixed coding and modulation with 99% link availability. To achieve a certain percentage of availability, fixed coding and modulation usually requires larger margin (i.e. higher SNR) to close the communication link. For example, 16APSK R-3/4 fixed coding and modulation scheme requires 17.5 dB to achieve 99% of availability (i.e. or equivalently 1% outage probability). Allowing the coding and modulation varies according to channel condition, at exactly the same SNR of 17.5 dB and 99% of availability, ACM achieves 4.8 bits/Sec/Hz on average, or equivalently 60% increased average rate, compared to fixed coding and modulation.

Figure 9:
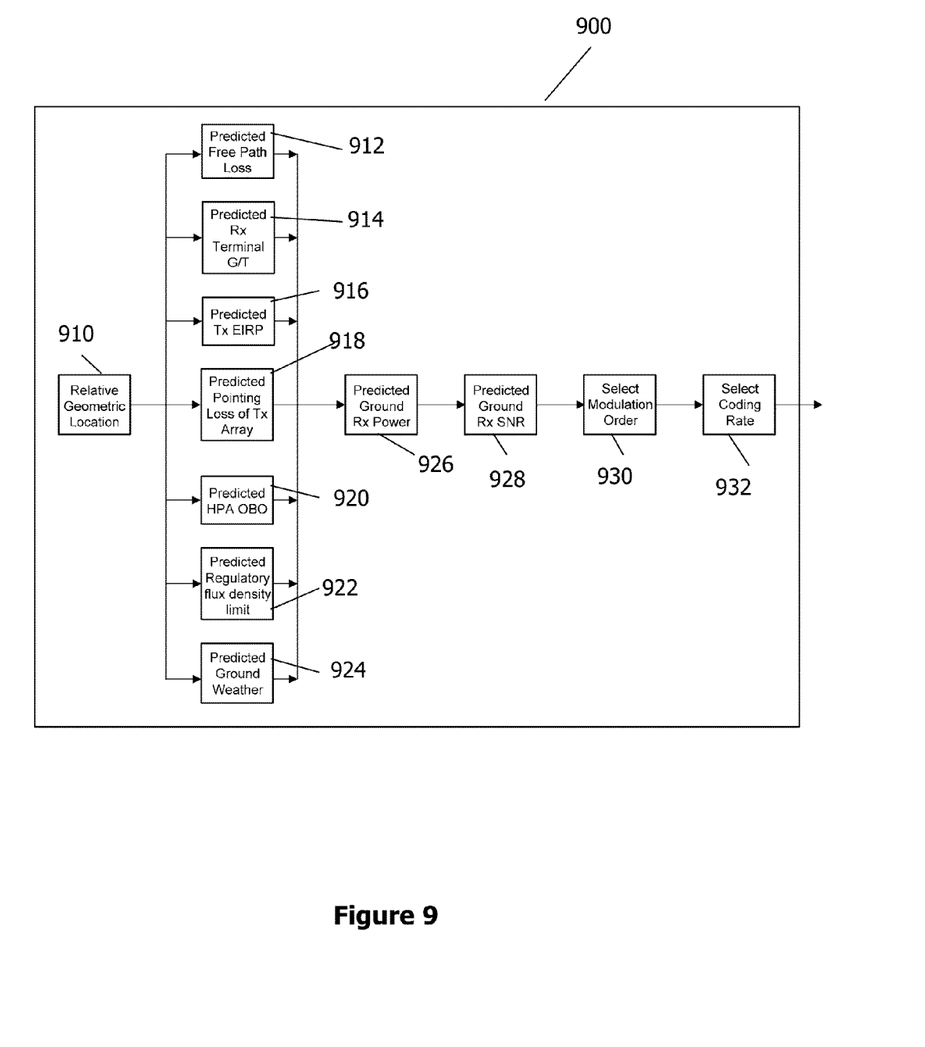
FIG. 9 is block diagram of an apparatus for implementing the invention.

FIG. 9 shows a block diagram of a LEO satellite 900. Module 910 keeps track of the relative geometric location of the satellite. Modules 912-924 operate in parallel to predict components of received SNR. Module 912 predicts free path loss, module 914 predicts receiver terminal G/T, module 916 predicts transmitter terminal EIRP, module 918 predicts pointing loss of a transmitter array, module 920 predicts high power amplifier output backoff (HPA OBO), module 922 predicts regulatory flux density limit and module 924 predicts ground weather. The output of modules 912-924 are provided to module 926, which combines the outputs to predict a receiver power and outputs it to module 928, which predicts a receiver SNR that is provided to module 930, which selects a coding and modulation for data to be transmitted by transmitter 900.

The apparatus of FIG. 9 in one example comprises a plurality of components such as one or more of electronic components, hardware components, and computer software components. A number of such components can be combined or divided in the apparatus.

The apparatus of FIG. 9 in one example employs one or more computer-readable signal-bearing media. The computer-readable signal-bearing media store software, firmware and/or assembly language for performing one or more portions of one or more implementations of the invention. The computer-readable signal-bearing medium in one example comprise one or more of a magnetic, electrical, optical, biological, and atomic data storage medium. For example, the computer-readable signal-bearing medium comprise, DVD-ROMs, Blue Ray discs, hard disk drives, Raid drives and other forms of electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method for transmitting data to a receiver by a LEO satellite comprising the steps executed by the LEO satellite of:
predicting a received signal-to-noise-ratio (SNR) experienced by the receiver based on a range between the LEO satellite and the receiver;
adapting the coding rate and modulation format of a transmitter in the LEO satellite to the predicted SNR without real-time feedback about the received SNR from the receiver.

2. The method of claim 1 wherein the receiver detects changes in transmission rate and changes its demodulation rate in tandem with the LEO satellite.

3. The method of claim 1 wherein the predicted SNR is based on location factors including at least one of range, elevation and trajectory.

4. The method of claim 1 wherein the predicted SNR is based on propagation loss factors including at least one of free space path loss, atmospheric/weather attenuation, receiver terminal G/T, transmitter terminal Equivalent isotropically radiated power (EIRP), predicted moisture level, predicted ground weather, pointing loss of a transmitter array, high power amplifier output backoff (HPA OBO) and predicted regulatory flux density limit.

5. The method of claim 1 wherein the predicted SNR is based on electronic performance factors, including at least one of gain or antenna scanning.

6. The method of claim 1 wherein data is transmitted by the transmitter at a variable rate in the range of Gigabytes per second (Gb/s), and feedback about variable conditions at the receiver is provided to the LEO satellite at a non-time critical period of at least once per hour.

7. The method of claim 6 wherein the variable conditions at the receiver include at least one of local weather and ground moisture level.

8. A LEO satellite for transmitting data to a receiver comprising:
one or more processors for predicting a received signal-to-noise-ratio (SNR) experienced by the receiver based on a range between the LEO satellite and the receiver;
a transmitter adapting the coding rate and modulation format of the transmitter to the predicted SNR without real-time feedback about the received SNR from the receiver.

9. The LEO satellite of claim 8 wherein the receiver detects changes in transmission rate and changes its demodulation rate in tandem with the LEO satellite.

10. The LEO satellite of claim 8 wherein the predicted SNR is based on location factors including at least one of range, elevation and trajectory.

11. The LEO satellite of claim 8 wherein the predicted SNR is based on propagation loss factors including at least one of free space path loss, atmospheric/weather attenuation, receiver terminal G/T, transmitter terminal Equivalent isotropically radiated power (EIRP), predicted moisture level, predicted ground weather, pointing loss of a transmitter array, high power amplifier output backoff (HPA OBO) and predicted regulatory flux density limit.

12. The LEO satellite of claim 8 wherein the predicted SNR is based on electronic performance factors, including at least one of gain or antenna scanning.

13. The LEO satellite of claim 8 wherein data is transmitted by the transmitter at a variable rate in the range of Gigabytes per second (Gb/s), and feedback about variable conditions at the receiver is provided to the LEO satellite at a non-time critical period of at least once per hour.

14. The LEO satellite of claim 13 wherein the variable conditions at the receiver include at least one of local weather and ground moisture level.

15. A LEO satellite communication system for providing adaptive coded modulation (ACM) during LEO satellite communications comprising:
a ground-based receiver for rapidly detecting changes in transmission rate and changing its demodulation rate in tandem with changes in the transmission rate; and
a transmitter in the LEO satellite for performing ACM in conjunction with predicted received SNR based on a range between the LEO satellite and the ground-based receiver without real-time feedback.

16. The LEO satellite communication system of claim 15 wherein the predicted SNR is based on location factors including at least one of range, elevation and trajectory.

17. The LEO satellite communication system of claim 15 wherein the predicted SNR is based on propagation loss factors including at least one of free space path loss, atmospheric/weather attenuation, receiver terminal G/T, transmitter terminal Equivalent isotropically radiated power (EIRP), predicted moisture level, predicted ground weather, pointing loss of a transmitter array, high power amplifier output backoff (HPA OBO) and predicted regulatory flux density limit.

18. The LEO satellite communication system of claim 15 wherein the predicted SNR is based on electronic performance factors, including at least one of gain or antenna scanning.

19. The LEO satellite communication system of claim 15 wherein data is transmitted by the transmitter at a variable rate in the range of Gigabytes per second (Gb/s), and feedback about variable conditions including at least one of local weather and ground moisture level at the receiver is provided to the LEO satellite at a non-time critical period of at least once per hour.

20. The method of claim 1, wherein the predicted received SNR is based on a predicted signal power at the receiver, $P_s$, according to the equation $$P_S(R) = 10\log_{10}(P_t) + 20\log_{10}\left(\frac{\sqrt{G}\lambda}{4\pi R}\right) - L(Tx\ Point\ Loss,\ HPA\ OBO)$$

where R is the range between the LEO satellite and the receiver, $P_t$ is the transmitted power, G is the antenna gain and L(Tx Point Loss, HPA OBO) is the loss function due to transmitter (Tx) pointing loss and high power amplifier (HPA) output back-off (OBO).

* * * * *